US006850962B1

(12) United States Patent
Povolny et al.

(10) Patent No.: US 6,850,962 B1
(45) Date of Patent: Feb. 1, 2005

(54) FILE TRANSFER SYSTEM AND METHOD

(75) Inventors: Gregory S. Povolny, Odessa, FL (US);
Michael Rivera, Lutz, FL (US); Randy Torres, Seffner, FL (US)

(73) Assignee: CommerceQuest, Inc., Tampa, FL (US)

( * ) Notice: Subject to any disclaimer, the term of this patent is extended or adjusted under 35 U.S.C. 154(b) by 0 days.

(21) Appl. No.: 09/306,790

(22) Filed: May 7, 1999

(51) Int. Cl.[7] .................................................. H01J 13/00
(52) U.S. Cl. ........................ 709/203; 709/219; 718/105
(58) Field of Search .............................. 718/100, 102, 718/105, 107; 709/200, 201, 203, 219, 100, 101, 103, 105, 106, 107

(56) References Cited

U.S. PATENT DOCUMENTS

| | | | |
|---|---|---|---|
| 5,390,239 A | | 2/1995 | Morris et al. .................. 379/93 |
| 5,548,724 A | * | 8/1996 | Akizawa et al. ............ 709/203 |
| 5,680,400 A | | 10/1997 | York .......................... 370/473 |
| 5,737,495 A | | 4/1998 | Adams et al. ............... 395/615 |
| 6,175,933 B1 | * | 1/2001 | Cadden ........................ 714/15 |

FOREIGN PATENT DOCUMENTS

| | | |
|---|---|---|
| EP | 0 851 366 | 7/1998 |
| EP | 0 862 304 | 9/1998 |
| WO | 97/36405 | 10/1997 |

OTHER PUBLICATIONS

"All about the Internet", Part 1–An Introduction, 1997, Roader, Konrad. <http://www.geocities.com/kgrr/internet/part1.html>.*
Technology Investments, Inc., "Statement of Work"; Mar. 6, 1998; pp. 1–4.
Copy of shipping receipt dated Jun. 30, 1998.
Technology Investments, Inc.; "Messaging Architecture Requirements and Discussion"; Nov. 17, 1997 pp. 1–14; 10 pages of drawings.
Drawings.

* cited by examiner

Primary Examiner—Majid A. Banankhah
(74) Attorney, Agent, or Firm—Foley & Lardner LLP (57) ABSTRACT

A system for transferring files between a source location and a target location can transfer different portions of the file across two or more logical channels. The portions of the file transmitted over the logical channels can be transmitted independently. In addition, the portions of the file can be transmitted over one or more logical channels asynchronously. The logic controls for managing the file transfer can be distributed over multiple systems located at separate locations and operating independently. During the transfer of the file, markers are generated that point to the location in memory where the file is stored. These markers obviate the need to store the file in a buffer or an archive log during the file transfer.

11 Claims, 9 Drawing Sheets

FILE TRANSFER SYSTEM AND METHOD

FIELD OF THE INVENTION

The invention relates generally to the field of file transfers, and more specifically, to a system and method for transferring files between computers asynchronously and across multiple logical connections.

BACKGROUND OF THE INVENTION

The advent of the Internet has spurred the generation of a number of protocols for transferring files or, more basically, data objects between two locations. The most commonly used protocols include the file transfer protocol (FTP), the transfer control protocol/Internet protocol (TCP/IP) and Telnet. To transfer a file, each of these protocols uses a point to point communication link between the source location of the file being transferred and the target location to which the file is being transferred. In general, the request for the file transfer must be made from the source system. The file is then transferred across the point to point communication link according to the rules of the particular protocol. For example, the protocols may break down the file being transferred into a number of segments that are sent one after the other instead of as a single large bundle.

For each of these protocols, a file is transferred over a single logical connection, which corresponds to the communication link between the source and target systems. In addition, the transmission of the file is performed synchronously, with the target system sending a confirmation after each segment of the file is sent. In part due to the synchronous nature of the file transfer, the source and target systems must both be operating and communicating with each other for the transfer to begin processing. The communication must also stay operational for the duration of the file transfer or processing must be restarted.

When making a file transfer between two locations, the data in the file is typically stored in a disk that serves as an archive log. The purpose of archive logs is to store the data being transferred so that, in the event of a problem or an error during the transfer, the data can be resent by transferring it from the archive log. Archive logs are costly, however, and the protection of large or numerous data files can diminish system performance.

SUMMARY OF THE INVENTION

Briefly, consistent with the present invention, a system for transferring a file from a first location to a second location comprises a logic control for establishing at least two logical channels between the first and second locations and a transmission device for transmitting at least a first portion of the file over a first logical channel and for transmitting a second portion of the file over at least a second logical channel independently of the transmission of the first portion of the file.

In a further aspect of the present invention, a system for transferring a file from a source location to a target location consistent with the present invention comprises first logic control for determining the status of the transfer of the file from a source location to a target location and generating determined status information, second logic control for generating a marker which holds a pointer to the source location of the data file, and third logic control for retransmitting the file from the source location indicated by the pointer in the marker to the target location if the determined status information indicates that the transfer was incomplete.

In yet a further aspect of the invention, a file transfer system consistent with the present invention comprises a requesting computer for submitting a request to transfer a data file, a managing computer for receiving the transfer request, identifying the location of the data file, and passing the transfer request to that location, a source computer, identified as having the data file by the managing computer, for receiving the transfer request from the managing computer and transferring the data file to a target location, and a target computer, corresponding to the target location, for receiving the transferred data file from the source computer.

In another aspect of the invention, a system for transferring a file from a first location to a second location consistent with the present invention comprises a logic control for receiving a request to transfer the file from the first location to the second location, and a transmission device for transmitting at least a first portion of the file asynchronously from a transmission of a second portion of the file.

DETAILED DESCRIPTION OF THE PREFERRED EMBODIMENT

The present invention will be described in the context of a specific embodiment, but the invention is not intended to be so limited.

Figure 1A:
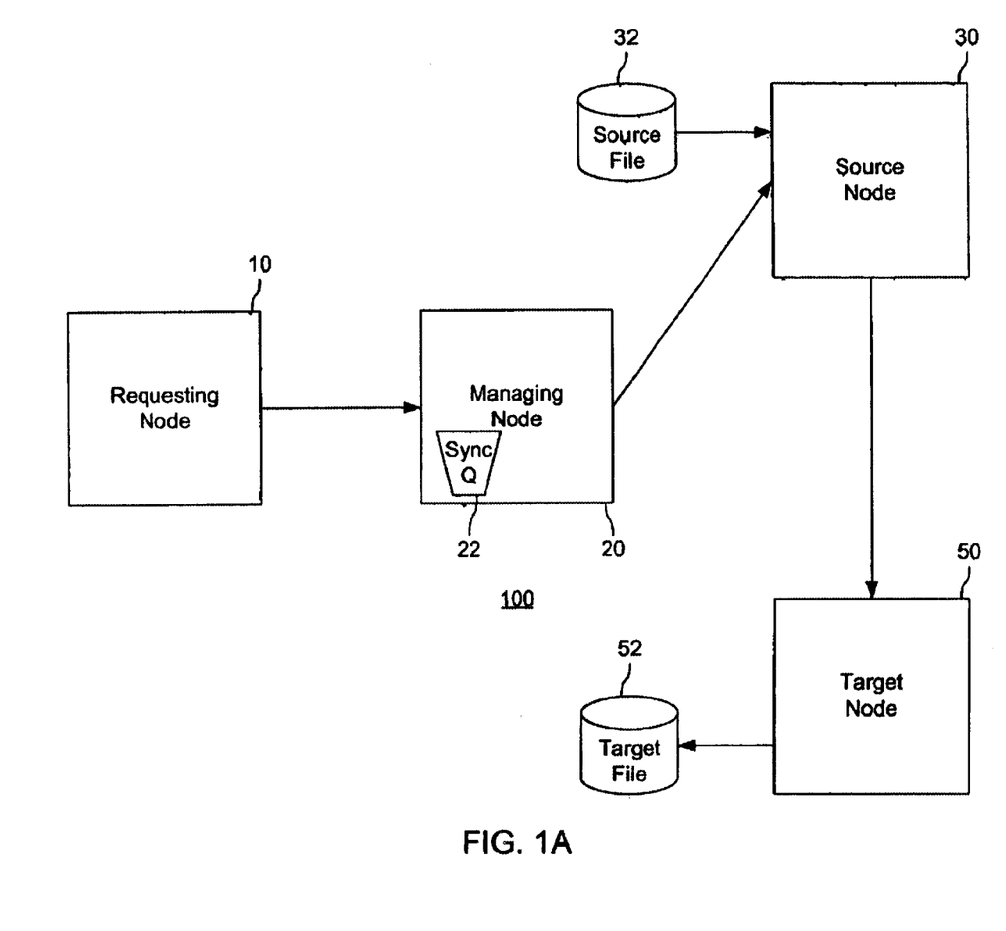
FIG. 1A is a block diagram of a file transfer system consistent with the present invention.

FIG. 1A is a block diagram of a file transfer system 100 consistent with the present invention. File transfer system 100 includes a requesting node 10, a managing node 20 for processing and managing file transfer requests having a sync queue 22, a source node 30 and a target node 50. The source node 30 includes a source memory 32, such as a hard disk drive, for storing a source file and a plurality of transmission queues to hold messages prior to transmission. The target node 50 includes one or more destination queues for receiving messages and a target memory 52, such as a hard disk drive, for storing a target file. Each of the nodes can be implemented, for example, as a personal computer or workstation. In addition, the communication links, which are the physical channels between the nodes, can be established via a network, a modem, a direct link, such as a cable or wireless transmission, the Internet or other communication links known to one skilled in the art. Using these physical channels, the nodes can establish one or more logical channels across each physical channel. Each logical channel corresponds to a different point-to-point communications session between the source and target systems, and is preferably uni-directional but can also be bi-directional. At least one of the source and target systems includes a plurality of logical addresses, each logical address being capable of establishing its own logical channel. For example, if there are two logical addresses at the source system and two logical addresses at the target system, a first logical address at the source system can have a logical connection to a first logical address at the target system, and a second logical address at the source system can have a logical connection to a second logical address at the target system. A logical channel can exist over an independent physical communications link or share the physical link with one or more other logical channels.

File transfer system 100 uses one or more logical channels across each physical channel to transfer a file from source node 30 to target node 50. The file is submitted to a message transport system, such as MQSeries (a product of IBM), which transmits the data corresponding to the file to be transferred across a physical link.

Figure 2:
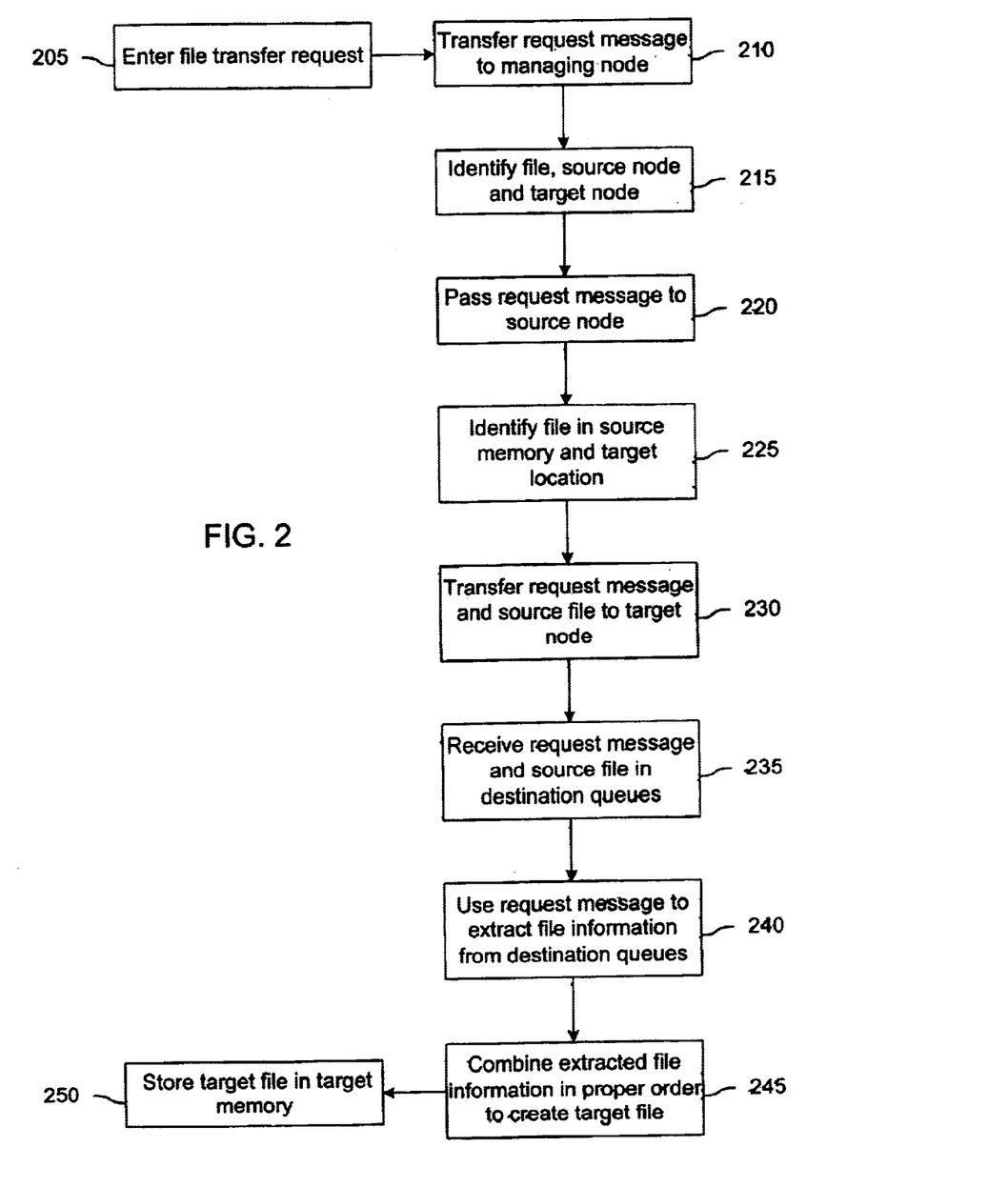
FIG. 2 is a block diagram flowchart of the operation of a file transfer system consistent with the present invention.

FIG. 2 is a flow diagram of an operation of file transfer system 100 consistent with the present invention. To transfer a file from source node 30 to target node 50, a user enters a file transfer request at requesting node 10 (step 205). The user enters the request through an interface at requesting node 10. The interface can be implemented, for example, as an application programming interface (API), a message queue interface (MQI), a graphical user interface (GUI) or a generic user interface (UI). The request entered by the user can be structured to form a control message, which includes application data and header data. The application data is one or a sequence of items held in a data string, with each item having a particular meaning to a particular application program. Header data is information that pertains to the properties of the message and can be held in a header record. The header data is used by file transfer system 100 to determine how to process the control message.

Figure 1B:
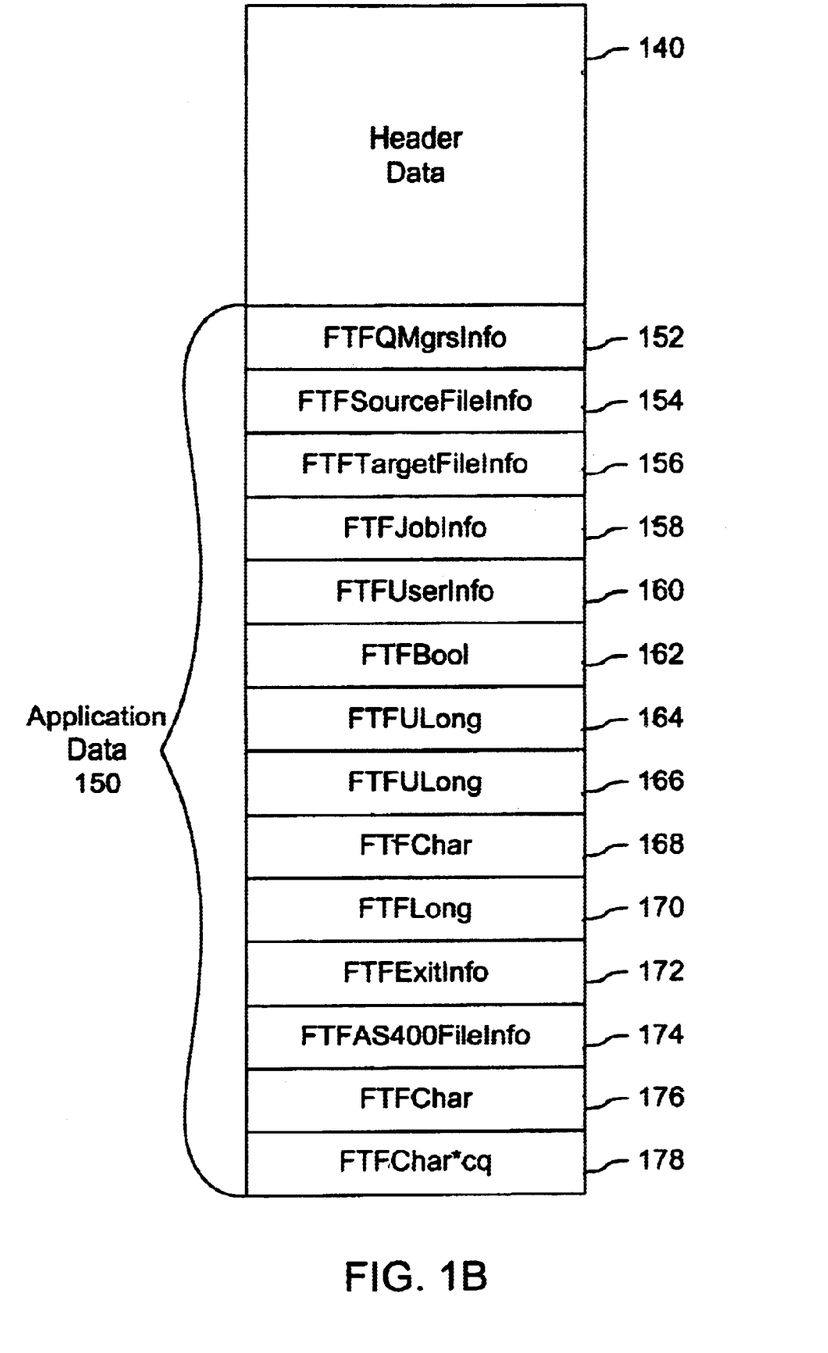
FIG. 1B is a block diagram of a message structure which can be used in a file transfer system consistent with the present invention.

FIG. 1B is a block diagram of a message structure for an operation such as a file transfer request which can be used for the control message in file transfer system 100 consistent with the present invention. As shown in FIG. 1B, the message structure includes header data 140 and application data 150. Within the application data 150 are a series of fields including FTFQMgrsInfo 152, FTFSourceFileInfo 154, FTFTargetFileInfo 156, FTFJobInfo 158, FTFUserInfo 160, FTFBool 162, FTFULong 164 and 166, FTFChar 168, FTFLong 170, FTFExitInfo 172, FTFAS400FileInfo, FTF-Char 176, and FTFChar*cq 178.

FTFQMgrsInfo 152 identifies which queue manager, defined below with respect to FIG. 3, to connect to on the source or sending system, which managing node to use, and which queue managers to use on the sending and target nodes. FTFSourceFileInfo 154 provides all of the details of the source file, i.e., the file to be transferred. FTFTargetFileInfo 156 provides all of the details of the target file, which corresponds to the file that is stored after being transferred to the target node 50, including allocation options. FTFJobInfo 158 includes details regarding how the file transfer is to be processed, including binary, ASCII, compression, priority, persistence and stage options. FTFUserInfo 160 provides information about the user making the file transfer request.

FTFBool 162 is a Boolean field which determines whether a reply is to be generated and sent back to the user at the requesting node 10 at the end of the file transfer. FTFULong 164 and 166 identify set time periods. Where FTFULong 164 determines the time at which the transaction should expire, and FTFULong 166 determines how long the interface should await a reply. FTFChar 168 is a character string that identifies which configuration file to use. The configuration file is used to inform the file transfer system 100 what queues to use, what pool rules to use (e.g. round robin, overflow, etc.), status subsystem rules (on/off, persistent/non-persistent), expiration conditions, and other rules as may be necessary.

FTFLong 170 sets forth which exits are installed. There can be, for example, eight different exit points that are called at strategic points during a file transfer including: pre-transaction initiation; sender pre-file access security check; sender pre-file read; sender post-file submit to a message queuing system; receiver pre-file access security check; receiver pre-file write; receiver post-file write; and post-transaction completion. If an exit is specified, the exit will be called under any circumstances. The exit is given full file transfer transaction control. In other words, the users installed exit can stop the transfer or allow the transfer to continue.

Additionally, a special exit called a portal allows a customer module to bypass the internal file transfer I/O of reading and/or writing a file. As a result, a user does not have to be concerned with the interfacing with the message transport system, the network, data integrity or designing for performance. File transfer system 100 provides a simple API to submit data or to retrieve data from the file transfer.

Exits and portals work by demand loading a specified dynamic link library with a specified entry point. However, the capabilities provided by exits and portals include the internal management of resources, memory snap shots, access to the status sub-system and tracking of the users custom exit activity to maintain the integrity of the file transfer transaction.

Internally, file transfer system 100 creates a work area in which the exit or portal being called is registered. Additionally, all resources are audited and state information is recorded. The exit is called or an API request is received from a portal, at which time the user has the control to stop or continue the transaction. Upon receipt of this information, file transfer system 100 determines the now current state. All work areas are cleared based on state information. If file transfer system 100 receives the codes to continue, data markers are updated and processing continues. If file transfer system receives the codes to discontinue, data markers are updated and the processing will terminate with the proper failure conditions and the transaction is ended.

The exits and portals are dynamically spawned when needed and operate in the same address space as file transfer system 100. This creates an environment where file transfer system 100 and the custom exits operate as a single program versus the loosely coupled approach of interfacing with external modules.

FTFExitInfo 172 provides optional input data for the exits to use during processing. FTFAS400FileInfo 174 provides the AS/400 personality, which is a simple way of describing the file attributes and rules that the file transfer system 100 will abide by when reading or writing a file. FTFChar 176 is a character string that serves as an identifier for the transaction. Lastly, FTFChar*cq 178 is a character string that sets forth where the file holding the configuration information, discussed above, is stored in a queue or in a file.

After the user enters the file transfer request, it is transferred as a control message to a designated managing node 20, which logs and manages the control messages corresponding to the file transfer requests (step 210). Managing node 20 examines the received control message to determine how to process the file transfer. Based on the information in the control message, including the header data, managing node 20 identifies the file to be transferred, the location of the file to be transferred, and the location to which the file is being transferred (step 215). The location of the file to be transferred corresponds to the source node 30, and the location to which the file is being transferred corresponds to the target node 50. Using this identified information, managing node 20 passes the file transfer request to source node 30 (step 220). In addition, managing node 20 places a transaction marker in sync queue 22 located in managing node 20 and submits status messages to file transfer system 100. A system log also keeps track of all failure information.

Upon receiving the file transfer request from managing node 20, source node 30 examines the request to identify the file in source memory 32 to be transferred and the location to send the file (step 225). Source node 30 then transfers the control message and the identified file, also referred to as the source file, to the identified location, which is the target node 50 (step 230). The source file can be, for example, a data file, an executable file, an application program, or any other form of information that can be stored electronically on disk or any other form of storage media known to one skilled in the art. Source node 30 also maintains the status of the transfer by placing a transaction marker in a sync queue 34 (shown in FIG. 7), replies to managing node 20 that is has processed the file transfer request, and generates status messages submitted to file transfer system 100.

To send a source file to target node 50, source node 30 can break down the file into a plurality of independent data messages, each having a message structure including header data and application data. Each data message includes a set amount of information from the file, such as 256K, which corresponds to the application data. The header data in each independent data message includes a message identification, a unique correlation identification (ID), the name of the destination of the message, and other message characteristics, such as those described above in the description of the message structure of FIG. 1B. The message identification, which can be stored in a header field MQMD.MessageID, associates each data message with the control message corresponding to the file transfer request. The correlation ID, which can be stored in a header field MQMD.CorrelationID, is necessary for determining the order in which the data messages are to be reassembled to form the original file. The control message and the data messages are assigned to one or more of a plurality of transmission queues present in source node 30, each transmission queue being assigned to a particular logical channel. The messages can be assigned to the transmission queues in any manner including, for example, filling the transmission queues in a round robin procedure, filling each transmission queue a certain amount and then filling the next one, filling a transmission queue until it is full and then filling the next one, placing messages in a transmission queue based on the quality of service (QoS) of the channel associated with that queue, or assigning messages based on a priority associated with a transmission queue or in accordance with some other convenient protocol. The manner that the messages are assigned to the queues can be determined from the FTF-JobInfo field 158.

The messages sent by source node 30 are received by target node 50 in one or more destination queues (step 235). To reconstruct the source file, target node 50 uses the control message to collect all of the data messages from the destination queues that are associated with the transmitted source file and extracts the file information from the application data in each data message (step 240). In particular, target node 50 uses the control message to extract the message ID and correlation ID sequence, which can then be used to retrieve the corresponding data messages from the destination queues. Target node 50 then combines the file information in the proper order to create the target file based on the unique correlation IDs stored in the header data of each data message (step 245). The target file is then stored in target memory 52 (step 250).

Each of the nodes in file transfer system 100 can operate independently and asynchronously from the operation of any of the other nodes and can operate on different and independent systems or platforms. The independent requesting node 10 concept allows a first system to transfer files between any two other systems without being present at either the source or target system. The independent managing node 20 obviates the need to have managing functions on each of the systems in file transfer system 100. As a result, each system in file transfer system 100 only needs the sending and receiving functionality to be able to send and receive files across file transfer system 100. Each system also preferably includes the requesting functionality of requesting node 10.

In addition to being completely independent, the functionality of the nodes can be grouped together on a single system. For example, the functionality of requesting node 10 and managing node 20 can be implemented on source node 30 or target node 50. Alternatively, the functionality of requesting node 10 can be implemented on one of source node 30 and target node 50, and the functionality of managing node 20 can be implemented on the other of source node 30 and target node 50.

During the file transfer, it is possible that one or more of the data messages are not received at target node 50, such as due to an error or the lapse of a predetermined amount of time. By using the status information generated during the file transfer, the file transfer can be completed without resending all of the data messages. Sync messages, described in more detail below, can be used by any of the nodes involved in the file transfer to determine which, if any, of the data messages has not been received at target node 50. Control logic can be included at each node which processes the sync messages to determine if a data message has not been received. This control logic then generates a message indicating that the data message has not been received. In response to this message, source node 30 retransmits the missing data messages or all of the data messages irrespective of what has been sent, depending upon the recovery scenario.

Figure 3:
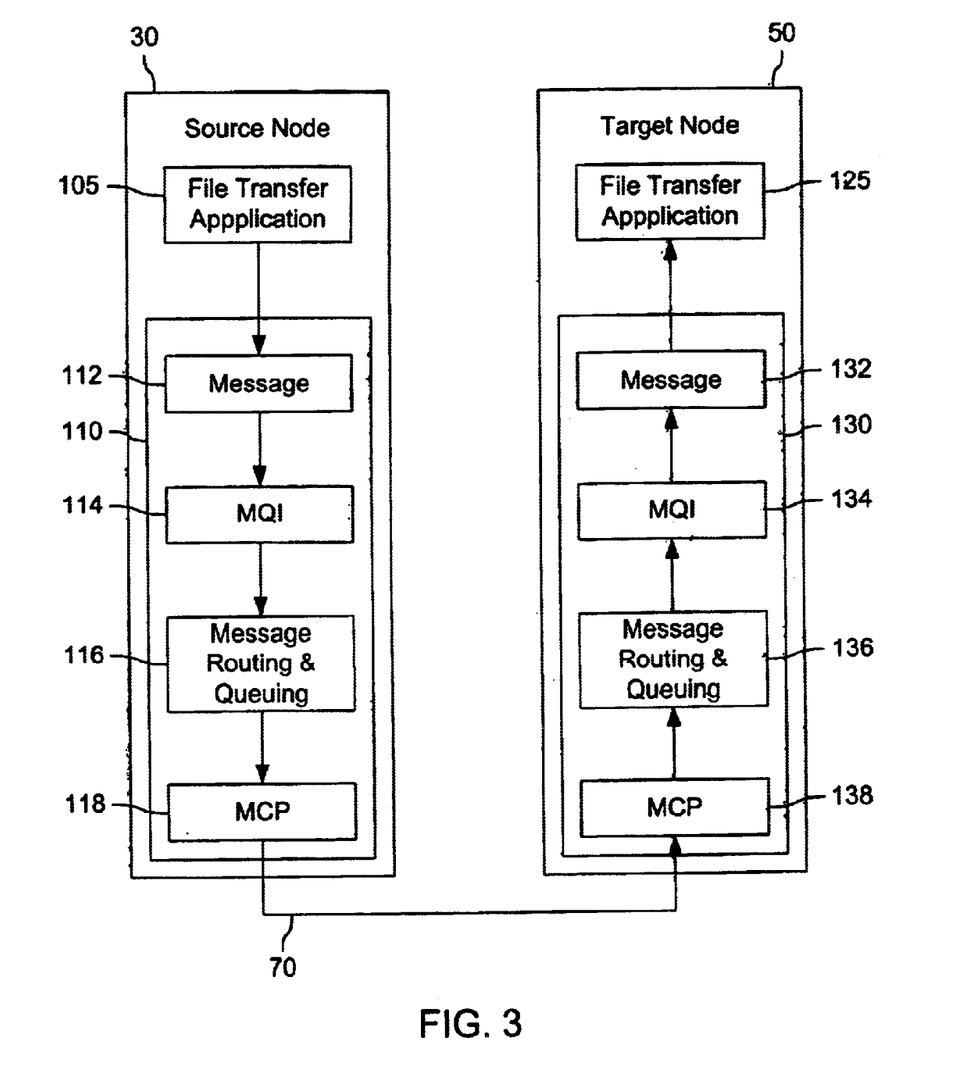
FIG. 3 is a block diagram of a message queuing system for managing file transfers in a file transfer system consistent with the present invention.

FIG. 3 is a block diagram of a message queuing system consistent with the present invention for managing the transfer of messages in file transfer system 100. As shown in FIG. 3, the message queuing system includes several components resident in both source node 30 and target node 50. Although not shown, these components can also be present on requesting node 10 and managing node 20. The components in source node 30 include a file transfer application 105 and a queue manager 110. Queue manager 110 receives a message 112 that is passed to a message queue interface (MQI) 114. Queue manager 110 also includes a message routing and queuing component 116 for placing the messages in one or more queues and a message channel protocol (MCP) 118 for establishing logical channels for each of its transmission queues and queues at remote nodes. Target node has the same components including a file transfer application 125 and a queue manager 130. Like queue manager 110, queue manager 130 includes a message queue interface (MQI) 134, a message routing and queuing component 136, and a message channel protocol (MCP) 138. MCPs 118 and 138 establish and maintain one or more logical channels 70 between source node 30 and target node 50. MQI 134 passes a message 132 to file transfer application 125.

Queue managers 110 and 130 are responsible for providing the message queuing services for the nodes in file transfer system 100. Each queue manager is an amalgamation of queue definitions, configuration tables, and software components whose operation is based on these definitions. Each queue manager also includes system administration programs which provide many of the configuration and administration elements of the message queuing system. Since file transfer system 100 can use the message queuing system to transfer files between separate systems, file transfer system 100 is preferably implemented as a distributed architecture with a queue manager resident on each node of file transfer system 100.

Figure 4:
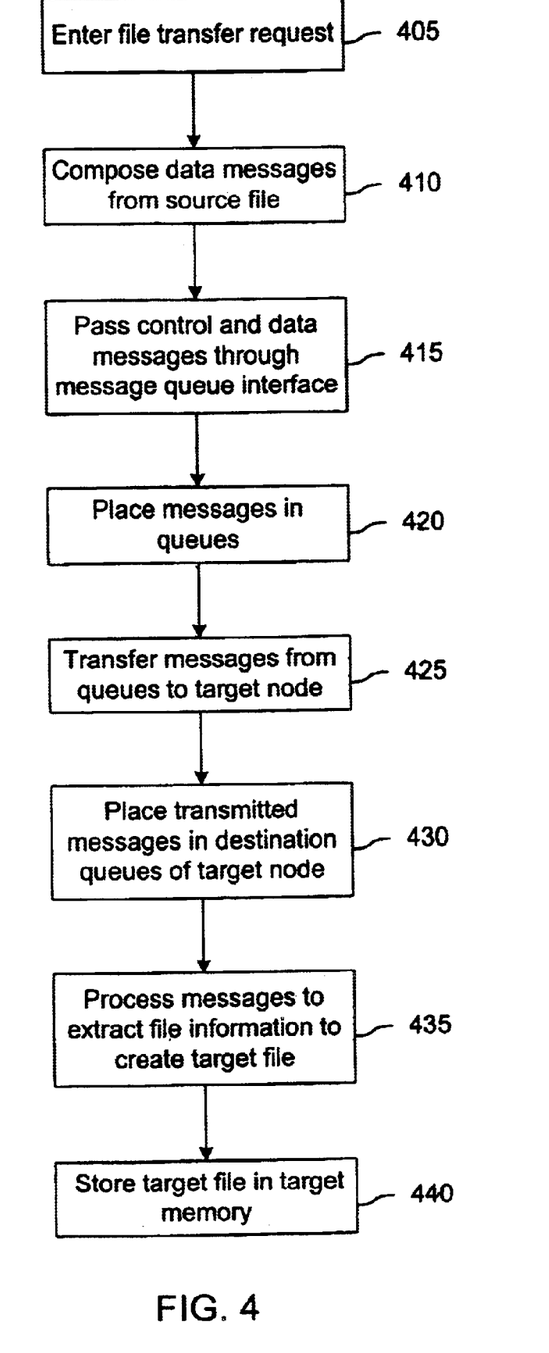
FIG. 4 is a block diagram flowchart of a process for transferring a file using the message queuing system of FIG. 3.

File transfer applications 105 and 125 comprise an interface to initiate any commercial or user written tasks, to be performed by the queue managers 110 and 130, using any of a plurality of common programming languages including, for example, COBOL, TAL, Java, C, C++, assembly/ALC, etc. The file transfer application allows a user to select a file to be transferred from any source node 30 to any target node 50 in file transfer system 100. FIG. 4 is a flow diagram of a process for transferring a file using the message queuing system of FIG. 3, consistent with the present invention. For the purposes of the description of FIG. 4, it is assumed that the requesting and managing functionality are implemented in source node 30. However, it should be understood that this functionality can alternatively be implemented on target node 50 or implemented independently of source node 30 and target node 50.

First, a user at source node 30 makes a file transfer request using file transfer application 105 (step 405). The file transfer request is processed by file transfer application 105 to form message 112 as a control message, which includes the identity of the file to be transferred and the destination to which the file is being transferred. If the file to be transferred was present in a system other than source node 30, the control message could also include the location of the file to be transferred.

In response to the file transfer request, file transfer application 105 composes one or more data messages, depending on the size of the file being transferred (step 410). As discussed above, each data message generated by file transfer application 105 includes a portion of the file being transferred to target node 50, a message ID, a correlation ID, and the destination of the message. Each of the messages created by file transfer application 105 is passed to MQI 114 (step 415). MQI 114, which serves as the interface between file transfer application 105 and queue manager 110, then passes the messages to message routing and queuing component 116, which places the received messages in one or more queues resident in message routing and queuing component 116 (step 420).

The queues resident in message routing and queuing component 116 can be, for example, simple FIFO disk-resident buffers for holding messages, although other queue structures known to those skilled in the art can also be used.

Messages that are intended for other applications running on source node 30, or which have been received from other nodes, are placed in local or destination queues in message routing and queuing component 136. On the other hand, messages destined for a remote system, such as target node 50, are placed on transmission queues. Accordingly, the control message and data messages resulting from a file transfer request from source node 30 to target node 50 would be placed in one or more transmission queues of message routing and queuing component 116.

To determine which queue to place the messages in, message routing and queuing component 116 looks at routing information placed in the header of each message by file transfer application 105. The routing information can include a queue name and a queue manager name that are used, in part, to determine in which queue to place the message. Each queue name can correspond, for example, to a different logical address of source node 30. The manner in which a message is placed in a queue is discussed in greater detail below with respect to FIGS. 5 and 6.

MCP 118 then transfers the messages from the transmission queues in message routing and queuing component 116 to target node 50 (step 425). The MCP at each node is responsible for establishing and managing the logical channels between each of its queues and the queues of remote nodes. MCP 118 supports several transport protocols including, for example, LU6.2, DECnet, TCP/IP, SNA and others known to those skilled in the art. Messages that are transferred from transmission queues in source node 30 to destination queues in target node 50 are transported across one or more channels. Each channel connects one or more transmission queues in source node 30 to one or more destination queues in target node 50. The channels between the queues are established by MCP 118 and MCP 138. Accordingly, each message transmitted to target node 50 is received by MCP 138 and placed in the appropriate destination queue by message routing and queuing component 136 (step 430). File transfer application 125 then processes the control message and the data messages to extract the file information from the data files and to reassemble the file information as the target file (step 435). File transfer application 125 stores the target file in target memory 52 (step 440).

Figure 5:
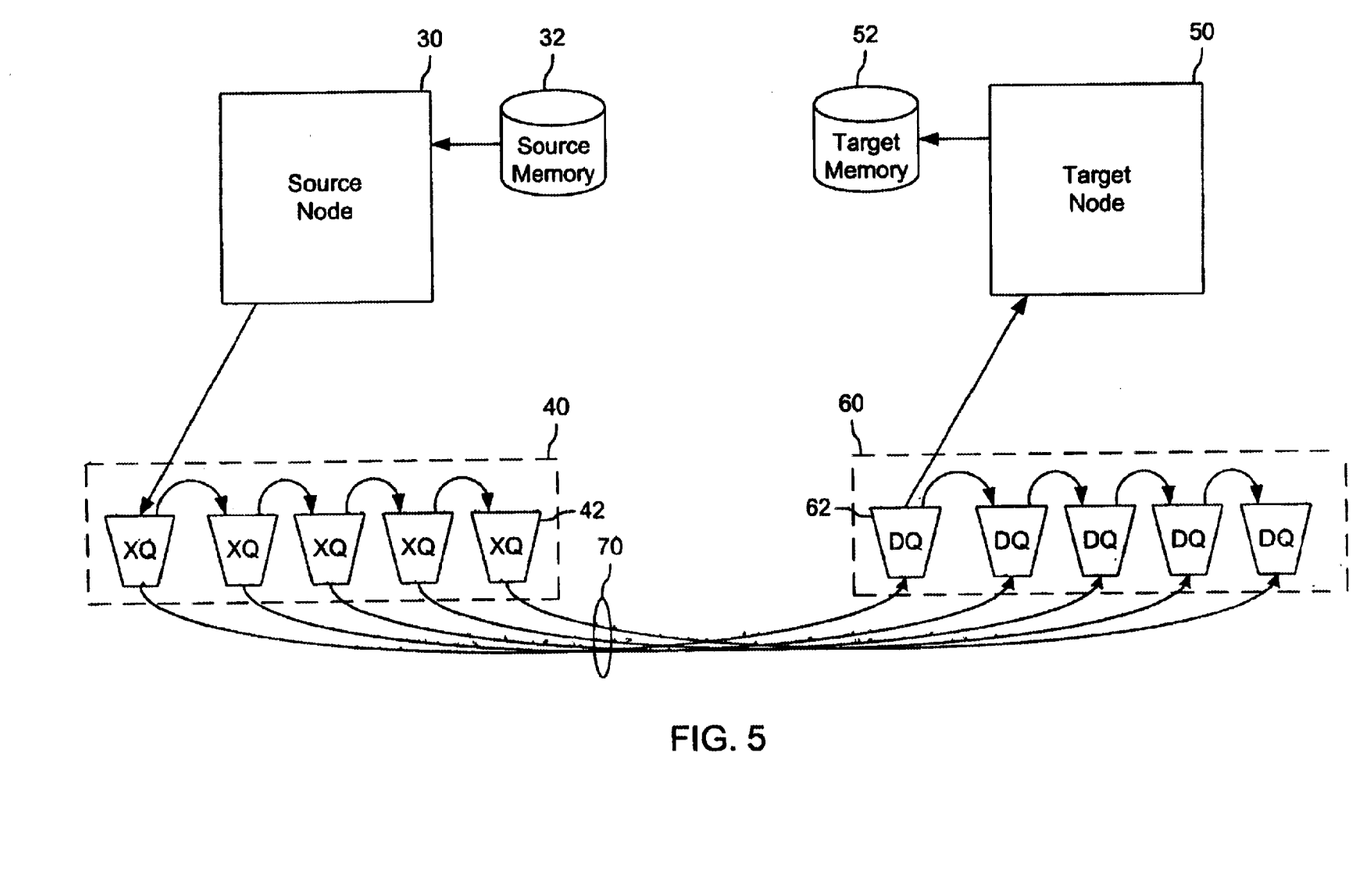
FIG. 5 is a block diagram of a file transfer system for transferring a file across multiple channels consistent with the present invention.

File transfer system 100 can transfer a file from source node 30 to target node 50 using a single channel or logical connection in a serial fashion, such that each of the messages in a file transfer request are sent one after the other. However, file transfer system 100 can also transfer a file asynchronously across multiple channels. FIG. 5 is a block diagram of a file transfer system 100 for transferring a file across multiple channels consistent with the present invention.

As shown in FIG. 5, source node 30 includes a transmission pool 40, which includes a plurality of transmission queues (XQ) 42. Similarly, target node 50 includes a destination pool 60, which includes a plurality of destination queues (DQ) 62. Each transmission queue 42 in transmission pool 40 is connected by an independent logical channel 70 to a one or more of the destination queues 62 in destination pool 60. Similarly, a destination queue 62 can be connected by an independent logical channel 70 to one or more transmission queues 42 in transmission pool 40. Transmission queues 42 and destination queues 62 can be implemented, for example, as simple FIFO disk-resident buffers used to hold the messages.

Figure 6:
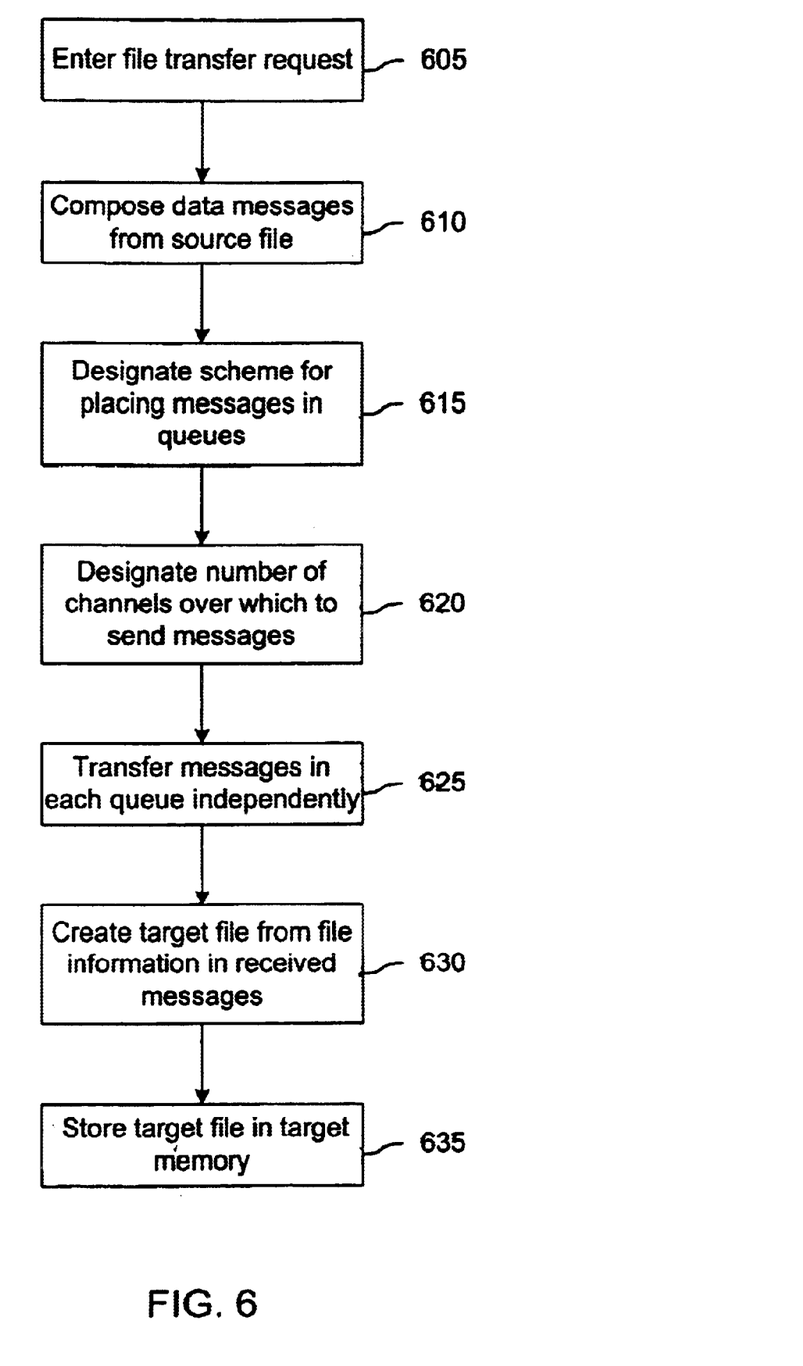
FIG. 6 is a block diagram flowchart of a process for transferring a file across multiple channels consistent with the present invention.

FIG. 6 is a flow diagram of a process for transferring a file across multiple logical channels consistent with the present invention. Like the description of FIG. 4, it is assumed that the requesting and managing functionality are implemented in source node 30. However, it should likewise be understood that this functionality can alternatively be implemented on target node 50 or implemented independently of source node 30 and target node 50. As shown in FIG. 6, a user first enters a file transfer request to transfer a file from source node 30 to target node 50 (step 605). The file transfer request is processed by file transfer application 125 to generate the control message and the data messages associated with the source file (step 610).

The generated messages are placed in transmission queues 42 by message routing and queuing component 116 of queue manager 110. Message routing and queuing component 116 places the messages in the transmission queues 42 according to a scheme designated by the user or according to a default scheme (step 615). As discussed above, the schemes for placing the messages in the transmission queues 42 include filling the transmission queues in a round robin procedure, filling each transmission queue a certain amount and then filling the next one, filling a transmission queue until it is full and then filling the next one, placing messages in a transmission queue based on the quality of service (QoS) of the channel associated with that queue, or assigning messages based on a priority associated with a transmission queue.

In addition to these schemes, a user can designate the number of logical channels over which to send the messages (step 620). As shown in FIG. 5, the user can designate five channels over which to send the messages to target node 50. If the user, for example, designated that the file transfer had a high priority and to use five logical channels, queue manager 110 would place the messages in five separate transmission queues 42, each having an independent logical channel connected to a respective destination queue 62 in destination pool 60 of target node 50. Queue manager 110 would also give these transmission queues priority in processing by transmitting messages from these transmission queues prior to the transmission of messages in queues of lesser priority.

After placing the messages in respective transmission queues 42 of transmission pool 40, the messages from each queue are transferred to the respective destination queue 62 independently of the messages from the other queues (step 625). Not only can the messages be transmitted independently, but they can also be transmitted asynchronously. For example, if the file transfer request resulted in a total of five messages corresponding to the control message and four data messages, each of the messages could be placed in one of the five designated transmission queues 42. The messages can then be transmitted to destination queues 62 in any order and at any time. Since file transfer application 125 reassembles the file based on the correlation IDs of each of the data messages, it does not matter if the data message corresponding to the last portion of the file being transferred is received first or last or is received an arbitrary amount of time before or after any other message associated with the file transfer.

Queue manager 130 reassembles the transferred file after all of the messages associated with the file transfer request have been received by destination queues 62 (step 630). The transferred file can be reassembled as the target file by extracting the file data from each of the received data messages and ordering each data portion according to the correlation ID of the associated data message. Queue manager 130 then stores the reassembled file as the target file in target memory 52 (step 635).

Figure 7:
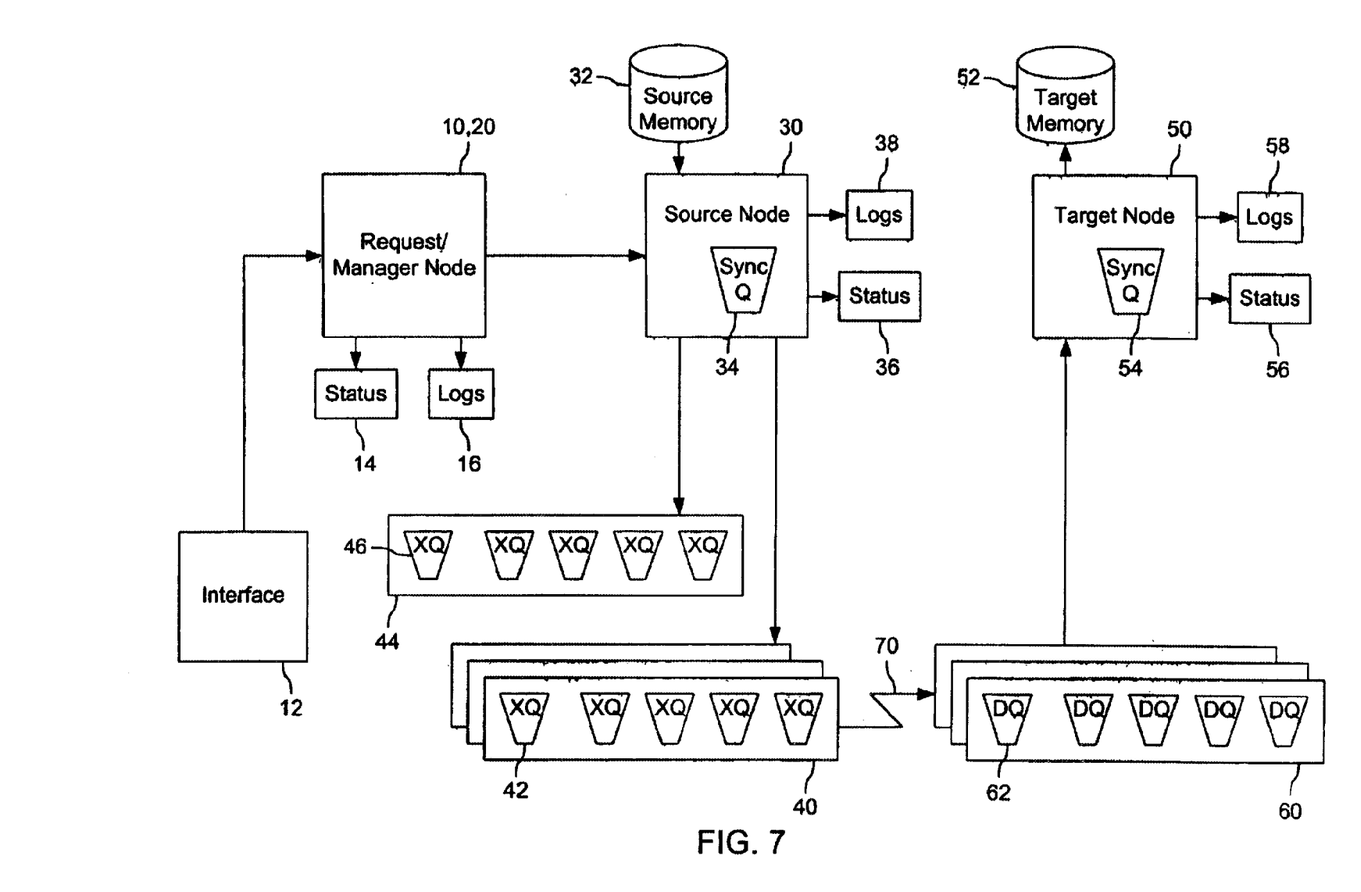
FIG. 7 is another block diagram of a file transfer system consistent with the present invention.

FIG. 7 is a more detailed block diagram of file transfer system 100. In addition to the elements shown in FIGS. 1 and 5, FIG. 7 shows that requesting node 10 and managing node 20 each include a status storage 14 and a log file 16. Requesting node and managing node 20 may also include a sync queue (not shown). Source node 30 also includes a status storage 36 and a log file 38, as well as a sync queue 34. Target node 50 similarly includes a status storage 46, a log file 48 and a sync queue 44. As shown in FIG. 7, file transfer system 100 also includes an interface 12, which can be implemented on any of the nodes and through which a user enters a file transfer request. Interface 12 can be implemented, for example, as an application programming interface (API), a message queue interface (MQI), a graphical user interface (GUI) or a generic user interface (UI).

As discussed above, each node in file transfer system 100 generates status messages that are sent throughout file transfer system 100 and are stored by the nodes in their respective status storage. Generally, the status message generated at a particular node is sent to other nodes in file transfer system 100 that are designated on a distribution list. The status messages can detail the activity of all the components involved in the file transfer, in addition to standard completion codes. As a result, an analysis of the status messages can provide a trace of what has taken place with respect to the file transfer and where a problem may have occurred. Furthermore, each node in file transfer system 100 can be configured to submit status messages at fixed or variable times or in response to particular events.

The log file at each node, such as log files 38 and 48, keeps a log of error and other maintenance information and keeps track of every detail of the file transfer. The log records, like the status messages, can be submitted as messages that are distributed throughout file transfer system 100. As a result, systems can keep logs of events taking place at remote systems, which enhances the capability of an administrator to provide management and maintenance at a remote system.

Figure 8:
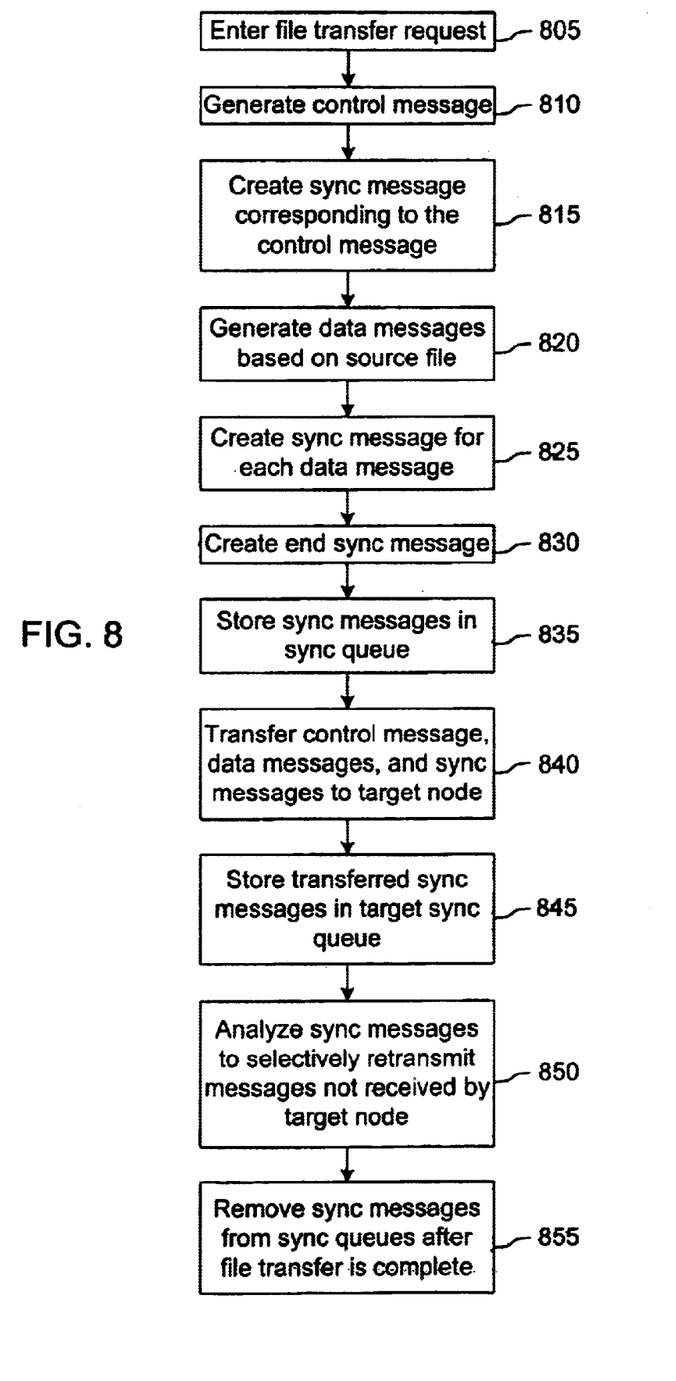
FIG. 8 is a block diagram flowchart of a sync queue process for managing the transfer of files in a file transfer system consistent with the present invention.

FIG. 8 is a flow diagram of a process for using sync queues in file transfer system 100 to manage retransmission of files consistent with the present invention. By using the sync queues, a file transfer can be completed, even if interrupted by a communication or node failure, without storing the data messages in a log file. The steps for transferring a file according to this process are the same as those described above with respect to FIGS. 2, 4 and 6. First, a user enters a file transfer request through interface 12 (step 805). The file transfer request is processed, for example, by queue manager 110 to generate the control message (step 810). In addition to creating the control message, a sync message is created that corresponds to the control message (step 815). This sync message serves as a begin marker for the file transfer. The control message is then processed to generate the data messages associated with the source file (step 820). Like the control message, a sync message is also generated for each data message (step 825). After generating the sync messages associated with the control message and data messages, an end sync message is also generated (step 830). All of the sync messages are stored in a sync queue, such as sync queue 34 (step 835). The sync queue is maintained even if the system crashes where the sync queue is located.

The sync message is a transaction marker, which can have an empty or zero byte length in its data portion. Within the header portion of each sync message corresponding to a data message is a pointer to the location of the data in the source file in source memory 32 that corresponds to the data in the data message. In addition, each sync message stores information about the status of the transmission of its associated message. There are also sync messages that are created that provide information specific to the sender, such as exit processing, persistence and non-persistence markers. Once all of the messages have been generated, the queue manager at the source node controls the transmission of the control message, data messages and all of the sync messages pertaining to the recovery of the file transfer to the target node (step 840). The sync messages sent to the target node are also stored in a sync queue, such as sync queue 54 (step 845).

This sync queue system allows all of the data corresponding to the file being transferred to be sent in a non-persistent or non-guaranteed manner. Transmitting the file in a non-persistent manner reduces the processing load for managing a file transfer. Although the control message and begin marker can also be transmitted in a non-persistent manner, they are generally transmitted in a persistent or guaranteed manner to ensure that the target system receives notification that the target system is going to receive a file.

Using either the sync messages stored in the sync queue at the source node or the sync messages stored in the sync queue at the target node, file transfer system 100 can selectively retransmit any messages that were not received by the target node (step 850). For example, since all of the sync messages after the begin marker are persistent, the target node would recognize that data has been lost if one or more of the sync messages associated with the data messages was not received. If the non-persistent marker, which is paired with a persistent marker, is not received at the target node, the target node would also recognize that there has been an error in the file transfer, such as the loss of data. In addition, if the source system crashes, the source system can look at the sync messages maintained in its sync queue, determine where the transmission left off, such as by analyzing the status information in the sync messages, and complete the transfer of the messages. Once the file transfer is complete, the sync queues are cleaned up by removing the sync messages from the sync queue that are associated with the completed file transfer (step 855).

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and a practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A file transfer system, comprising:
   a requesting computer for submitting a request to transfer a data file;
   a managing computer for receiving the transfer request, identifying the location of the data file, and passing the transfer request to that location;
   a source computer, identified as having the data file by the managing computer, for receiving the transfer request from the managing computer and transferring the data file to a target location; and
   a target computer, corresponding to the target location, for receiving the transferred data file from the source computer; and
   wherein the requesting computer, managing computer and target computer are separate and independent computers.

2. A file transfer system according to claim 1, wherein the requesting computer, the managing computer, the source computer, and the target computer are separate and independent computers.

3. A file transfer system according to claim 2, wherein the requesting computer, the managing computer, the source computer, and the target computer are resident in separate and independent locations.

4. A file transfer system according to claim 1, wherein the requesting computer, and the source computer are a single computer, and the managing computer and the target computer are separate and independent computers.

5. A file transfer system according to claim 1, wherein the requesting computer, and the target computer are a single computer.

6. A file transfer method, comprising the steps of:
   submitting a request to transfer a data file at a requesting computer;
   receiving the transfer request at a managing computer, identifying the location of the data file, and passing the transfer request to that location;
   receiving the transfer request at a source computer, identified as having the data file by the managing computer, from the managing computer and transferring the data file to a target location; and
   receiving at a target computer, corresponding to the target location, the transferred data file from the source computer; and
   wherein the requesting computer, managing computer and target computer are separate and independent computers.

7. A file transfer method according to claim 6, wherein the requesting computer, the managing computer, the source computer, and the target computer are separate and independent computers.

8. A file transfer method according to claim 7, wherein the requesting computer, the managing computer, the source computer, and the target computer are resident in separate and independent locations.

9. A file transfer method according to claim 6, wherein the requesting computer, and the source computer are a single computer.

10. A file transfer system, comprising:
    a requesting computer for submitting a request to transfer a data file;
    a managing computer for receiving the transfer request, identifying the location of the data file, and passing the transfer request to that location;
    a source computer, identified as having the data file by the managing computer, for receiving the transfer request from the managing computer and transferring the data file to a target location; and
    a target computer, corresponding to the target location, for receiving the transferred data file from the source computer; and
    wherein the source computer, managing computer and target computer are separate and independent computers.

11. A file transfer method, comprising the steps of:
    submitting a request to transfer a data file at a requesting computer;
    receiving the transfer request at a managing computer, identifying the location of the data file, and passing the transfer request to that location;
    receiving the transfer request at a source computer, identified as having the data file by the managing computer, from the managing computer and transferring the data file to a target location; and receiving at a target computer, corresponding to the target location, the transferred data file from the source computer; and wherein the source computer, managing computer and target computer are separate and independent computers.

* * * * *